(12) United States Patent
Batwara et al.

(10) Patent No.: US 8,799,631 B2
(45) Date of Patent: Aug. 5, 2014

(54) DYNAMICALLY SELECT OPERATING SYSTEM (OS) TO BOOT BASED ON HARDWARE STATES

(75) Inventors: Ashish Batwara, Wichita, KS (US); James K. Sandwell, Wichita, KS (US); Siddhartha Kumar Panda, Bangalore (ID); Sisir Kumar Dash, Bangalore (IN)

(73) Assignee: LSi Corporation, San Jose, CA (US)

( * ) Notice: Subject to any disclaimer, the term of this patent is extended or adjusted under 35 U.S.C. 154(b) by 318 days.

(21) Appl. No.: 12/944,051

(22) Filed: Nov. 11, 2010

(65) Prior Publication Data
US 2012/0124354 A1    May 17, 2012

(51) Int. Cl.
*G06F 9/00* (2006.01)
*G06F 1/32* (2006.01)

(52) U.S. Cl.
USPC .............................................. 713/1; 713/320

(58) Field of Classification Search
None
See application file for complete search history.

(56) References Cited

U.S. PATENT DOCUMENTS

| 5,134,580 | A | 7/1992 | Bertram et al. |
| 7,356,677 | B1 | 4/2008 | Rafizadeh |
| 2002/0152372 | A1* | 10/2002 | Cole et al. ........................ 713/2 |
| 2005/0151713 | A1* | 7/2005 | You ................................ 345/98 |
| 2008/0244289 | A1* | 10/2008 | LeProwse et al. ............ 713/320 |
| 2009/0113430 | A1* | 4/2009 | Riley ............................ 718/101 |
| 2010/0121992 | A1* | 5/2010 | Chen .............................. 710/26 |
| 2010/0122077 | A1 | 5/2010 | Durham |

* cited by examiner

*Primary Examiner* — Kim Huynh
*Assistant Examiner* — Vincent Chang
(74) *Attorney, Agent, or Firm* — William W. Cochran; Cochran Freund & Young LLC

(57) ABSTRACT

Disclosed is a microprocessor based system with a dynamically selectable Operating System that is capable of providing unique operating systems based upon current hardware states without user intervention. The system will determine the current state of the system and select from a plurality of operating systems the best operating system to load. In normal operating conditions the system will select the most full-featured and robust operating system. If, for example, the system loses alternating-current power, the system will shutdown, reboot, and automatically select an operating system with very limited capabilities and limited power consumption to allow the system to retrieve important data from the cache and store the data to a data storage device.

6 Claims, 4 Drawing Sheets

300 Boot Option Table

| Battery Enabled bit | A/C available bit | Action |
|---|---|---|
| 0 | 0 | Microprocessor Power down due non-availability of power |
| 0 | 1 | Boot OS(1) |
| 1 | 0 | Battery Engaged, boot OS(2) |
| 1 | 1 | Boot OS(1) |

DYNAMICALLY SELECT OPERATING SYSTEM (OS) TO BOOT BASED ON HARDWARE STATES

BACKGROUND

Microprocessor based systems, such as computers, are very useful in creating, storing, processing and accessing data. A microprocessor based system can include but is not limited to embedded computing systems, laptops, desktops, mobile telephones, network appliances, or any other microprocessor based system utilizing an operating system. The ability to save data and later retrieve this data, can be a very important aspect of many computer systems. This data can typically be stored on either a volatile or non-volatile media device. When power fluctuations occur, systems can become unstable, potentially giving rise to data loss. It is therefore beneficial to build in safeguards into these systems to preserve this data. Battery backup units often allow additional time to shut systems down in the event of a problem, thus giving the user time to save data.

SUMMARY

An embodiment of the present invention may therefore comprise a method of dynamically selecting and switching operating systems to boot based on hardware states without any manual intervention comprising: scanning a data bus at bootup for a device contained within the bus to assemble a bit register containing a record of all peripheral devices found within the bus; modifying a standard boot loader that reads the bit register to determine a hardware status of the microprocessor based system; determine the state of hardware devices in the microprocessor based system; selecting an operating system for the microprocessor based system based upon the hardware status from a group of potential operating system candidates stored within a data storage device; executing the operating system based upon the current hardware status; reading cache for the microprocessor based system; connecting a peripheral data device to the microprocessor thereby allowing data to be securely stored offline after reboot; and copying the cache to the peripheral data device to be securely stored offline after reboot.

An embodiment of the present invention may further comprise A method of selecting an operating system in a microprocessor based system upon alternating current power failure comprising: detection of the loss of alternating current power; rebooting the microprocessor based system; determining hardware status at time of reboot; and, selecting an operating system for the microprocessor based system based upon the hardware status from a group of potential operating system candidates stored within a data storage device.

DETAILED DESCRIPTION OF THE PREFERRED EMBODIMENTS

Figure 1:
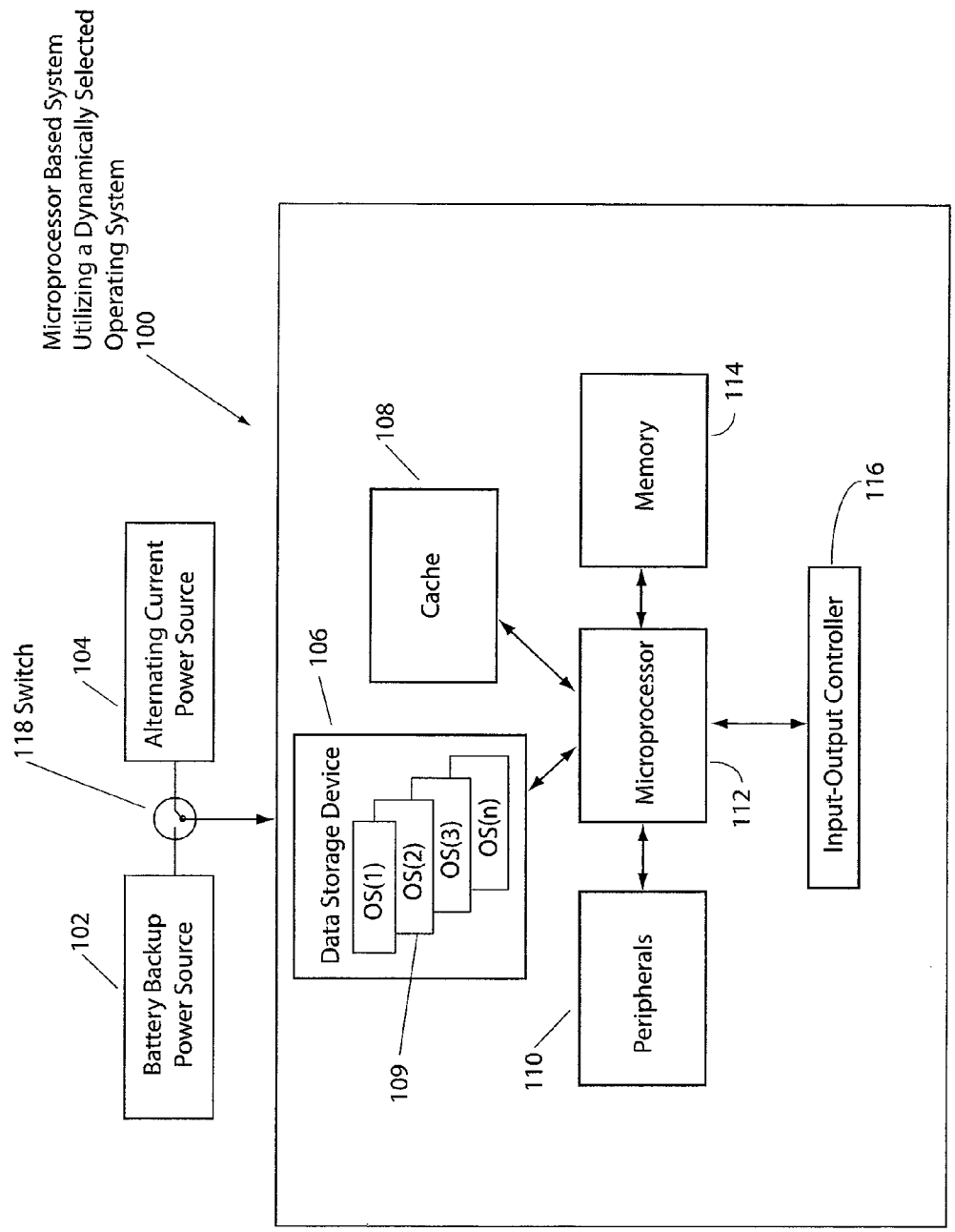
FIG. 1 is a block diagram of a microprocessor based system utilizing a dynamically selected operating system.

FIG. 1 is a block diagram of a microprocessor based system utilizing a dynamically selected operating system 100. Battery backup 102 or A/C power source 104 can be automatically switched at switch 118 to deliver power depending up on power availability. When alternating-current for power supply 104 is disconnected or otherwise interrupted, power delivery is automatically switched from power supply 104 to battery backup 102.

Microprocessor based systems, such as illustrated in FIG. 1, are generally built around a central processing unit, such as microprocessor 112. Supporting devices such as peripherals 110, memory 114, data storage devices 106, and cache 108 are power consuming devices commonly found in microprocessor based systems. A plurality of different operating systems are stored in a data storage device 106 that is connected to microprocessor 112. Data storage devices 106 exist on the data bus and can reside internally to the system in such forms as a hard drive, a solid state drive, flash memory drive or other similar form of data storage. Data storage devices 106 may also exist on the data bus while residing externally to the system in such forms as Universal Serial Bus drives, network attached devices, external hard drives or other similar form of data storage. The plurality of operating systems 109 can be accessed by microprocessor 112 so that microprocessor 112 can load any of the operating systems 109 that is the most desirable for the operating environment of the microprocessor based system 100. Operating systems 109 vary depending upon the operating environment of the system and the functions the system performs. Operating systems can be written, for instance, to maximize system speed and minimize power efficiency, or maximize power efficiency at the expense of system speed. An operating system written to increase power efficiency may often sacrifice system performance and system features in order to reduce power consumption. Some operating systems may go so far as not enabling certain devices to minimize power consumption. Such a strategy may be important when limited power resources may be available to protect critical data.

As shown in FIG. 1, operating power for the microprocessor 112, and other parts of the system is typically obtained from an alternating current power supply 104. In the event of loss of power emanating from the alternating current power supply 104, a battery backup 102 system can supply power to the system as illustrated in FIG. 1 via the switch 118. The microprocessor 112 checks the status and consistency of the power delivery and stores the status in a bit register. The bit register will send an instruction signal to the microprocessor depending upon value found in the boot option matrix (explained in FIG. 3), the microprocessor 112 will load the appropriate operating system 109 in accordance with the current status of the power delivery system. The microprocessor 112 also registers the status of the peripherals 110, the configured memory 114, input-output controller 116 and any cache 108 in use and stores them in the bit register 406 as explained in FIG. 4. In the event that the microprocessor based system 100 boots into an operating system with a restricted instruction set, the operating system will load only critical devices necessary for retrieving important data and securely storing that data to the data storage device 106. Loading only critical devices is needed for placing a limited load on the battery backup 102 to allow the system to shutdown, reboot, load a limited operating system, save critical data and shutdown again before running out of backup power.

Figure 2:
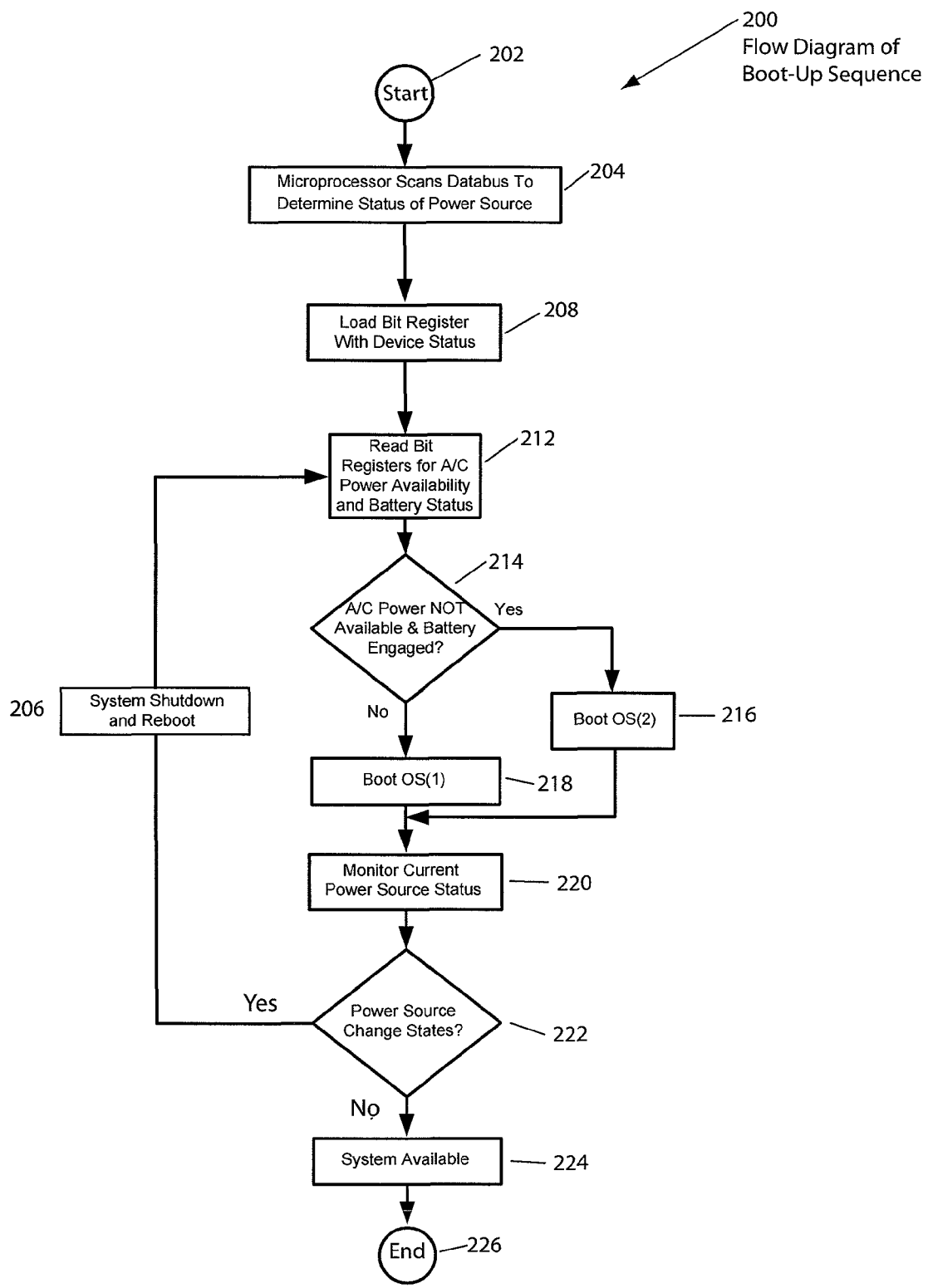
FIG. 2 is a flow chart illustrating a typical boot-up sequence based on hardware states of a dynamically selected operating system.

FIG. 2 is a chart illustrating flow diagram of a boot-up sequence 200 utilized in accordance with an embodiment of the present invention showing multiple boot options based upon current hardware states and operating system selections. As shown in FIG. 2, at step 202 the process is initiated. At step 204, microprocessor 112 scans the data bus to determine the current status of the power source, either battery backup power source 102 or alternating current power source 104. A common data bus used in microprocessor based systems is the Peripheral Component Interconnect or PCI bus, but a boot up sequence will work on most data bus systems. At step 208, the bit register 406 reads the current device status including the power source status. The microprocessor then reads the bit register to check the power source status at step 212. At step 214, if alternating-current power is not available and the battery is engaged, the system described in FIG. 1 will send an instruction signal from the bit register to proceed to step 216 and select secondary operating system(2). However, if A/C power is available and the battery is not engaged, the system 100 will continue to step 218 and select primary operating system(1). The microprocessor 112 continues to monitor the bit register 406 for current power source state at step 222. If the power source changes as in step 206, the system shuts down and reboots and then re-reads bit register 406 for A/C power availability and loads the appropriate operating system for the microprocessor based system. At step 224 the system is available for normal use. At step 226 the boot sequence is complete.

Figure 3:
FIG. 3 is a matrix of possible boot options of a dynamically selected operating system.

FIG. 3 illustrates an embodiment showing a boot option table 300 of a dynamically selected operating system 100 that can be accessed by microprocessor 112, as shown in FIG. 1. FIG. 3 demonstrates various options available to the microprocessor based system 100, which the processor can use to select an operating system without user intervention, based upon the bits that are set in a register that stores a data bit indicating the power status, such as illustrated in FIG. 3. For example, when the battery enabled bit is read as 0, and A/C available bit is read as 0, the microprocessor shuts down due to non-availability of power. When the battery enabled bit is read as 0, and A/C available bit is read as 1, the microprocessor dynamically selects boot operating system(1). However, when battery enabled bit is read as 1, and A/C available bit is read as 0, the microprocessor dynamically selects boot operating system(2). In the final example when battery enabled bit is read as 1, and A/C available bit is read as 1, the microprocessor will dynamically select boot operating system(1). This list is not exhaustive and could continue on with multiple bit selection options as well as multiple boot operating system options.

Figure 4:
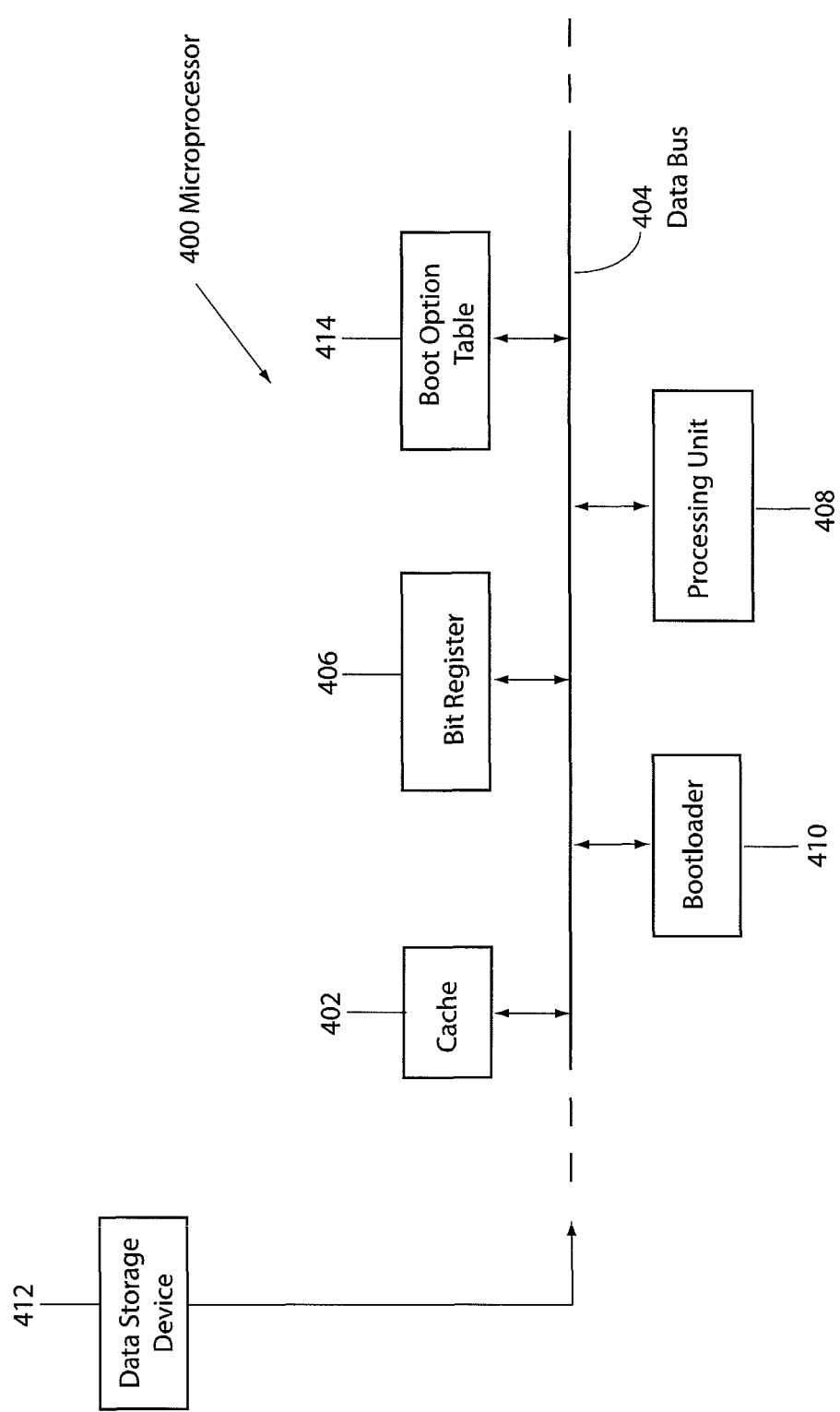
FIG. 4 is an illustration of typical microprocessor components.

FIG. 4 is a block diagram of one embodiment of a microprocessor 400 that can be used in the microprocessor based system 100 shown in FIG. 1. Most microprocessors 400 have internal cache 402, which stores recently or frequently used data. A data bus 404 connects the cache 402, bit register 406, processing unit 408 and boot loader 410, and delivers data from peripherals 110. A bit register 406 stores data bits containing system and data information (such as the data stored in boot option table 300 of FIG. 3). The processing unit 408 processes system instructions from bit register 406 send via the instruction signal including the selection of an operating system from the boot option table 414 from data contained in table 300 of FIG. 3. When microprocessor 400 is first powered up, boot loader 410 loads the operating system selected by processing unit 408 utilizing the logic from table 300 to select the operating system for the conditions as determined by the data in the bit register 406. The boot loader 410 is a small program which may be stored in read-only memory along with data needed to access nonvolatile devices from which operating system programs and data are loaded into random access memory. The boot loader program functions to load other data and programs which are then executed from random access memory. Hence, the microprocessor 400 does not utilize an operating system in read-only memory or random access memory, but rather, is able to select from various operating systems stored on a data storage device 412 and delivered on the data bus 404.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of selecting an operating system to operate a single processor unit in a microprocessor based system comprising:
monitoring the status of a switch that connects one of at least two power sources to said single processor unit;
generating power source data bits that identify which power source of said at least two power sources is currently supplying power to said single processor unit;
storing said power source data bits in a bit register;
monitoring said power source data bits that are stored in said bit register to determine which power source is supplying power to said single processor unit;
reading said power source data bits automatically during booting said single processor and when there is a change in status of said power source data bits; and,
automatically selecting an operating system to operate said single processor unit in said microprocessor based system from a plurality of operating systems stored within a data storage device based upon said power source data bits that indicate which power source is currently supplying power to said single processor unit.

2. The method of claim 1 further comprising:
connecting a peripheral data device to said single processor unit thereby allowing data to be securely stored offline after reboot.

3. The method of claim 1 further comprising:
using a boot loader to boot said operating system selected to operate said single processor unit.

4. The method of claim 2 wherein said process of connecting a peripheral storage device to said single processor unit comprises:
connecting a peripheral data storage device to said single processor unit that allows cached data to be securely stored on said peripheral data storage device offline after reboot.

5. A microprocessor based system that is capable of dynamically selecting an operating system from a plurality of operating systems to boot and operate a single processor unit in said microprocessor based system based upon which power source of a plurality of power sources is supplying power to said single processor unit comprising;
an alternating current power source that delivers power to said single processor unit;
a battery backup power source that delivers power to said single processor unit when said alternating current power source is not available;
a switch that automatically selects said alternating current power source, or said battery backup power source when said alternating current power source is not available;

a data storage device that stores said plurality of operating systems;

a bit register that stores power source data bits that indicate when power supplied to said single processor unit is supplied by said alternating current power source and when power is supplied by said battery power source;

said single processor unit reading said power source data bits from said bit register and generating an instruction signal based upon said power source data bit;

a bootloader that reads said instruction signal from said single processor unit and dynamically loads said single processor unit with one of said plurality of operating systems, without user intervention, to operate said single processor unit in response to said instruction signal.

6. The microprocessor based system of claim 5 wherein said single processor generates said instruction signal by comparing said power source data bits with a boot option table.

* * * * *